United States Patent [19]

Tillement et al.

[11] Patent Number: 4,842,684
[45] Date of Patent: Jun. 27, 1989

[54] DEVICE FOR AUTOMATICALLY SHAPING A SHEET OF FIBRES ON A MOULD, AND APPARATUSES COMPRISING SUCH A DEVICE

[75] Inventors: Pierre Tillement, Decazeville; Andre Greffioz, Figeac, both of France

[73] Assignee: Forest Line of B.P., Capdenac, France

[21] Appl. No.: 76,252

[22] Filed: Jul. 21, 1987

[30] Foreign Application Priority Data

Jul. 21, 1986 [FR] France .................. 86 10538

[51] Int. Cl.⁴ ............................................. B32B 31/00
[52] U.S. Cl. ..................................... 156/538; 156/247; 156/584
[58] Field of Search ............... 156/247, 249, 433, 349, 156/60, 538–540, 522–523, 543, 534, 166, 577; 764/247, 257, 264, 265

[56] References Cited

U.S. PATENT DOCUMENTS

| | | | |
|---|---|---|---|
| 3,278,667 | 10/1966 | Knox | 264/257 |
| 3,468,743 | 9/1969 | Soriano | 156/527 |
| 3,775,219 | 11/1973 | Karlson | 156/363 |
| 3,959,049 | 5/1976 | Tanaka et al. | 264/257 |
| 3,962,397 | 6/1976 | Narci et al. | 264/171 |
| 4,086,313 | 4/1978 | Axer et al. | 264/257 |
| 4,474,845 | 10/1984 | Hagerman et al. | 264/257 |
| 4,582,558 | 4/1986 | Antonson | 156/523 |
| 4,636,276 | 1/1987 | Nozaka | 156/522 |

FOREIGN PATENT DOCUMENTS

| | | |
|---|---|---|
| 144927 | 6/1985 | European Pat. Off. . |
| 2801540 | 7/1979 | Fed. Rep. of Germany ...... 156/522 |
| 2529871 | 3/1986 | France . |

OTHER PUBLICATIONS

W. Ermert et al., "Herstelling von Bauteilen aus CFK mit Industrierobotern", Plast-Verarbieter, vol. 33, No. 4, Apr. 1982, p. 400, lines 30–60.

Primary Examiner—Jay H. Woo
Assistant Examiner—Mathiew Vargot
Attorney, Agent, or Firm—Bert J. Lewen; Henry Sternberg

[57] ABSTRACT

An apparatus for use in the industry of shaping a sheet of fibres on a mould for the manufacture of a range of articles such as aircraft wings, in which a sheet or ribbon of glued or adhesive sized fibres is automatically shaped on the mould, the apparatus having an applicator (16) for engaging the fibre elements (7) on the mould (2) and, at a place immediately upstream, a wedge-shaped element (19) having a rounded edge and adapted to separate the top protective film (8) from the fibres prior to their engagement with the mould, and a slot (18) sized to the width of the film and operative to remove the same and to provide accurate guiding of the fibres immediately thereafter engaged on the mould.

11 Claims, 2 Drawing Sheets

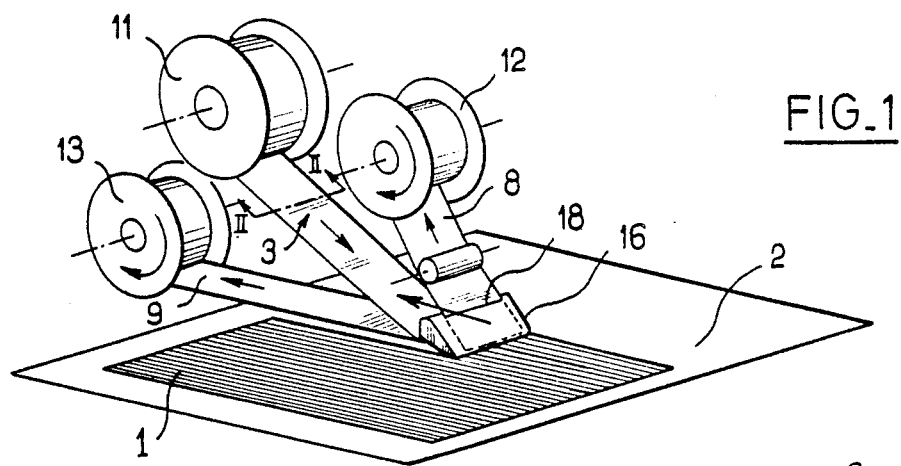
FIG.1
FIG.2
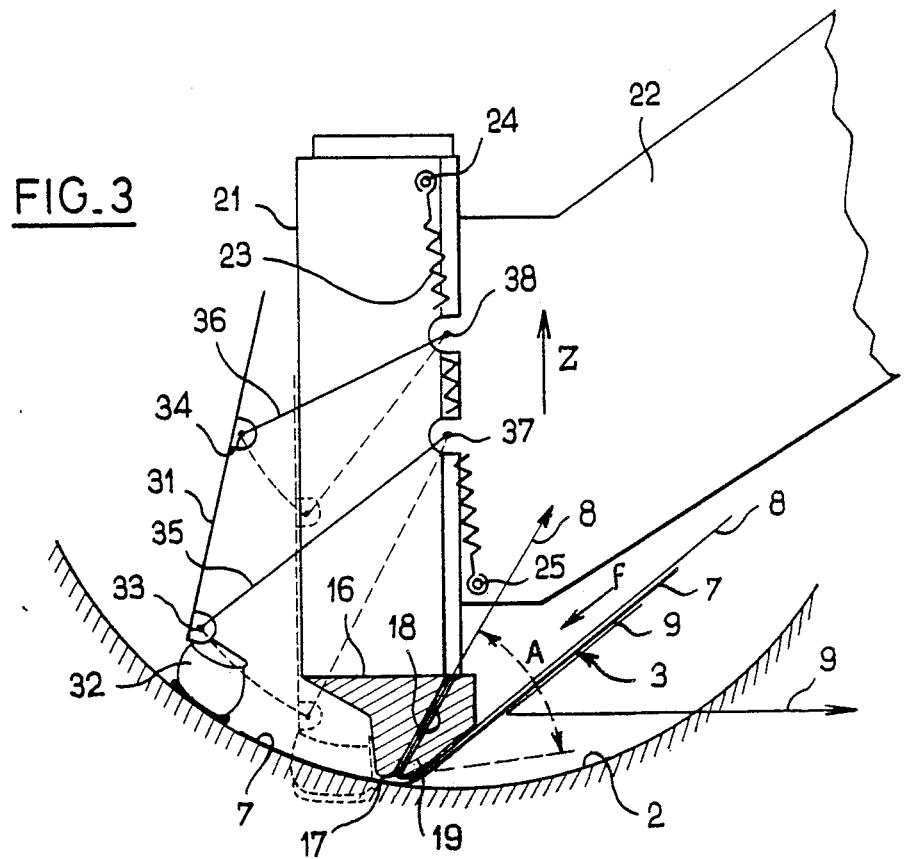
FIG.3

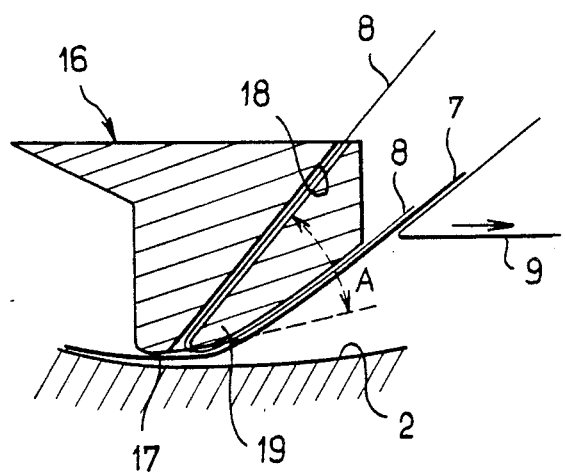
FIG_4
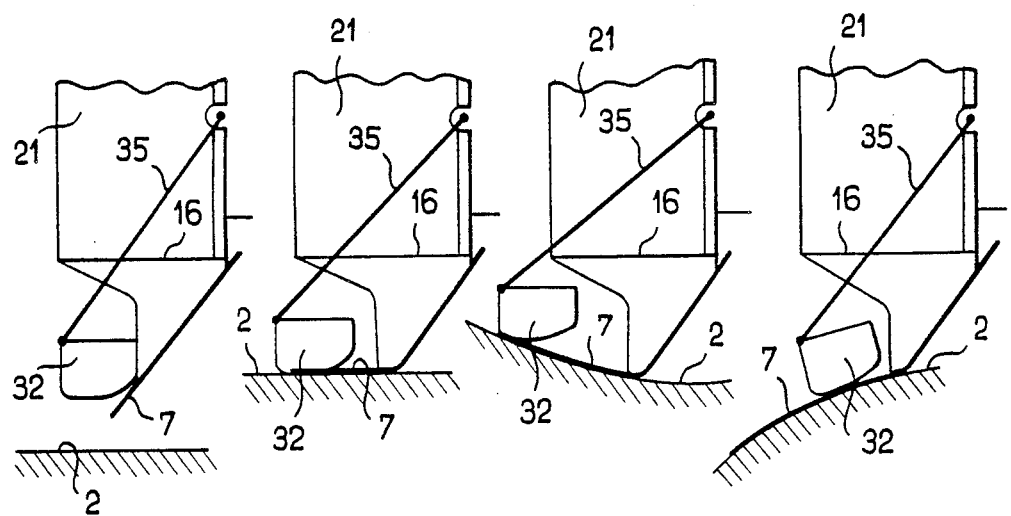
FIG_5   FIG_7   FIG_6   FIG_8

DEVICE FOR AUTOMATICALLY SHAPING A SHEET OF FIBRES ON A MOULD, AND APPARATUSES COMPRISING SUCH A DEVICE

BACKGROUND OF THE INVENTION

The invention relates to the automatic shaping of a sheet or ribbon of fibres on a mould for the production of a range of articles such as aircraft wings, for example, from a composite strip consisting of glued or adhesive sized fibre elements, for example, glued or adhesive sized by impregnation with epoxy resin, which are precut to the required shape and dimensions and which are retained between two protective films as far as the place where they are engaged on the mould. As a rule, the top film consists of a paper strip having appropriate mechanical and chemical characteristics while the bottom film is a very thin film of plastics. The resulting composite strip, whose width is often between 25 and 150 mm and which is about 250 m long, is presented in the form of a reel with end plates of approximately 450 mm in diameter.

The technique resides in placing very accurately on the mould the precut and impregnated fibre elements carried along in the form of the composite strip referred to. The conventional apparatus e.g. as known from French Pat. No. 2,529,817 accordingly has a roller or similar pressure applicator for engaging the fibre strip on the mould, the top paper strip being recovered after passing below the applicator roller while the bottom protective film has of course been removed immediately before the fibres are pressed on to the mould.

There are a number of disadvantages inherent in using a roller of this kind for engaging the strip with the mould, whether it is unitary or in the form of a number of parts.

First, the paper tends to deviate laterally because of unevennesses in the mould surface, particularly if the surface is out of true, so tht appreciable random errors in the positioning of the precut fibre elements on the mould arise. Using a very flexible roller would not solve the problem.

This disadvantage seems unavoidable in the case of machines using a roller to apply the strip to the mould, for to prevent lateral deviations of the strip the same would have to be guided laterally in the immediate vicinity of the zone where the roller engages it with the fibres. Unfortunately, there is no possibility of providing a strip-guiding cheek projecting from the cylindrical surface of the roller at each of its two ends for the two cheeks would then bear on the mould and the roller could not perform its function of pressing the fibres on the mould. Conseqeently, the only way of guiding the strip is by elements disposed some distance from the fibre engagement zone; unfortunately this distance is excessive for satisfactory guiding of the strip because the applicator roller is already of a fairly substantial diameter and also because the reel from which the composite strip unwinds, and the reel on which the paper is wound after the fibres have been placed on the mould, are relatively distant from the fibre-engaging zone; these two reels cannot really therefore be expected to be of use as really efficient lateral guiding elements for the strip. This conventional general layout also limits apparatus performances since it means that the mould recesses cannot have a reduced radius of curvature.

Also, it has been found by experience that using an applicator roller leads to the formation of a "wave" on the fibres, with a resulting reduction in compacting quality, with repercussions on the characteristics of the end product.

The difficulties in placing the fibres satisfactorily on the relatively even surace of the mould arise mainly from the problem that the protective paper shifts at the place where the fibres are engaged on the mould.

SUMMARY OF THE INVENTION

It is the object to obviate this disadvantage.

The invention accordingly relates first to a process residing in guiding and separating the top protective film (often made of paper) from the fibre strip at the place immediately before the place where the fibre strip is pressed into engagement with the mould.

The novel process helps to obviate any lateral shift of the paper and of the fibres rigidly secured thereto since the paper is guided substantially as far as the place where the fibres are pressed into engagement with the mould. The paper is unaffected by mould surface unevenesses and the fibres are retained in position very accurately substantially as far as the place where they will be pressed on to the mould.

The invention also relates to a device for performing the process hereinbefore set out, the device comprising in known manner; an applicator for engaging the fibre elements on the mould; means for removing the bottom protective film upstream of the place of engagement of the fibres on the mould; and means for removing the top film (often made of paper), wherein the means for removing the top film are disposed at a place immediately upstream of the applicator for engaging the fibre elements on the mould.

Of course, this device benefits from the advantages of the process which it performs and which have been explained in the foregoing.

Advantageously, the applicator is in the form of a pad having a surface which engages the fibre elements on the mould and on which the composite strip arrives, the means for removing the top protective film taking the form of a slot with which the pad is formed and which has the sam width as the strip, the slot having its entry in the upstream part of the fibre-applying surface of the pad and preferably forming with such surface an acute angle inclined rearwardly relatively to the direction in which the strip arrives at the pad.

In addition to the general advantages hereinbefore set out, a device of this kind does not cause the "wave" noted when an applicator roller is used; consequently, fibre compacting is maintained and the end product is of better quality.

The invention also relates to apparatuses for automatically shaping fibre layers on a mould and having a device of the kind hereinbefore set out and more particularly as described and claimed hereinafter.

BRIEF DESCRIPTION OF THE DRAWINGS

The invention will be more clearly undersstood from the following description and from the accompanying drawings which illustrate by way of example an embodiment of a fibre applicator device according to the invention and in which:

FIG. 1 is a simplified perspective view aimed at showing the principle of the device;

FIG. 2 is a view to a larger scale and in cross-section through the composite fibre strip, the section being on the line II—II of FIG. 1;

FIG. 3 is a partly sectioned side view of an embodiment of the device;

FIG. 4 is a side view to an enlarged scale of a detail of the bottom part of FIG. 3, and FIGS. 5-8 are simplified views showing phases in the operation of the device of FIG. 3 with differently shaped moulds.

DESCRIPTION OF PREFERRED EMBODIMENT

Referring first to FIG. 1, a fibre sheet or ribbon 1 is being formed on the surface of a mould 2 from a composite strip 3. The strip 3, whose structure can be seen more clearly in the enlarged cross-sectional view in FIG. 2, consists of glued or adhesive sized fibre elements 7, for example, by being impregnated with epoxy resin, which are precut to the required shape and dimensions and retained between two protective films, namely in the present example a top paper film 8 of appropriate mechanical and chemical characteristics and a bottom film 9 made of a thin plastics film. The strip 3 unwinds from a reel 11 (or from a cassette) whereas while the glued or adhesize sized fibres are being deposited on the mould the paper strip 8 winds on to a reel 12 and the plastics film 9 winds on to another reel 13.

The device for placing the fibre elements 7 on the mould surface comprises an applicator which in this example is a pad 16 (see also FIG. 3). The surface of the mould 2 in FIG. 3 is assumed to be concave whereas it is shown flat in FIG. 1; however, the process of forming the fibre sheet is the same in both cases. The pad 16 has a surface 17 (see also FIG. 4) for engaging the fibre elements 7 on the mould surface. The strip 3 arrives from the rear (the meanings of "rear" and "front" are indicated in FIG. 3) of the pad 16—i.e., having shed its bottom film 9 it first reaches the upstream part of the fibre-engaging surface 17, then, having further shed its top film 8, it reaches the downstream part of the surface 17 to be pressed thereby on to the mould surface. The pad 16 is formed with a calibrated slot 18 of the same width as the strip 3; the slot 18 extends between the upstream part of the pad surface 17 and the top surface of the pad; also, it forms with the upstream part of the pad surface 17 an acute angle "A" inclined rearwardly relatively to the direction, indicated by an arrow , in which the strip 3 arrives at the pad 16. The rear part thereof is operative as a paper-separating element in the form of a wedge 19 having a rounded edge. The slot 18 is so devised that the protective paper film or strip 8 can be removed in proportion as the fibres are placed on the mould (see also FIG. 1). The slot 18 is also operative as an element for guiding the strip 3 accurately very near the zone where the fibres are engaged on the mould, particularly by way of the two ends of the slot 18 disposed at the two ends of the rounded edge of the separator 19, the portions of the top film 8 sliding on them.

The pad 16 is secured to the bottom part of a slide 21 vertically slidable, as indicated by an axis 2, on a head 22 forming part of an apparatus, the remainder of which has not been shown for the sake of simplicity. Movements of the slide 21 on the head 22 and movements thereof above the mould 2 can be numerically programmed or be performed under the supervision of sensors scanning the mould surface during the scanning movements of the head above the mould. Also, a spring 23 having one end connected to the slide 21 at a place 24 and the other end connected to the head 22 at a place 25 biases the slide resiliently downwards. The device further comprises a compacting element 31 whose bottom part carries a resilient bead 32 for pressing the fibres onto the mould. The bead 32 is disposed in front of the pad 16, i.e. downstream thereof, and in the present example is carried by the head 22. The bead 32 is not rigidly secured to the head 22 but is secured thereto by way of means for imparting to it a movement temporarily following the shape of that part of the mould on which the fibre ends are initially deposited. The compacting element 31 has a generally vertical orientation and is pivotally connected by way of two pivots 33, 34 to those ends of two rods 35, 36 respectively which are distant from one another, the rod ends which are near one another being pivotally connected to the head 22 by way of two further pivots 37, 38 respectively. The compacting element 31 is biased downwardly by its own weight and by the weight of the moving members which support it, with or without further biasing by a spring.

OPERATION OF THE DEVICE

The device operates as follows:

The composite strip 3 starts to unwind accurately from the reel or cassette 11 (FIG. 1) until the end of the blank to be placed on the mould is presented below the pad 16 devoid of its bottom film 9 and top paper 8, as shown at 7 in FIG. 5, this operation being supervised by a photoelectric cell (not shown). All the operations proceed automatically under the supervision of a numerical control facility which will not be described in detail herein since it does not form part of the invention. The head 22 (FIG. 3) descends on to the mould 2. The resilient compacting bead 32, with whose bottom surface the end of the blank 7 to be positioned is already in engagement, is the first to arrive on the mould and so presses the blank end strongly on to such surface. The head 22 of the apparatus descends a litle further and the time arrives when the bottom surface 17 of the pad 16 in turn presses the fibre sheet 7 on the mold by the weight of the slide 21 and pad 16 and by the force of the spring 23; the head 22 then soon stops descending but during this time the only movement which the bead 32 can make, because of the structure of the mechanism supporting it, is the movement which has transferred it from the position shown in FIG. 5 to the position shown in FIG. 6—i.e., it has advanced a little relatively to the pad 16 and mould 2 and, in so doing, has rubbed from rear to the front on the end of the blank 7 which it engages effectively on the mould surface. The head 22 now starts to return—i.e., to move to the right in FIG. 3—while the bottom line 9 drawn by the reel 13 (FIG. 1) and the top paper 8 drawn by the reel 12 disengage from the composite strip 3 so that all that arrives on the pad surface 17 is just the sheet of fibres 7, i.e., the blank to be placed on the mould. The pad 16, biased resiliently on to the mould, therefore progressively applies the sheet 7 thereto from the end of the sheet 7, which is firmly stuck by the bead 32, to the rear end of the sheet 7. When the pad 16 leaves the rear end of the sheet 7, the head 22 rises. The operation of positioning the sheet 7 is terminated. The head 22 is positioned and oriented automatically to prepare the placing of the next sheet 7 and the same cycle of operations restarts.

Referring to FIG. 6, the behaviour of the bead 32 in the case of a concave mould 2, as shown in FIG. 3, has just been seen. The bead 32 would behave in just the same way with a flat mould as shown in FIG. 7 or with a convex mould as shown in FIG. 3, the only difference being that it rises and/or moves away from the pad by an amount which varies with mould shape.

In order not to burden the description unnecessarily with details not relating directly to the invention, no description has been given of the automatic control means for initiating and supervising the various operation involved in a cycle, such as seeking the sheet 7 to be placed, accurate unwinding of the strip as far as its correct position on the pad, the descent of the head 22 on to the mould in accordance with the three co-ordinates axes and axes of orientation, detection of engagement of the pad with the mould, return of the head with unwinding of the strip pressed on the mould, detection of the end of positioning of the sheet 7, the rising of the head and its new positioning and its orientation for placing the next sheet 7.

We claim:

1. A device for automatically shaping a ribbon of fibers onto a mold from a composite strip formed of a ribbon of adhesive sized fiber elements precut to required shape and dimensions, and retained between a bottom protective film and a top protective film, the device comprising applicator means arranged for automatically engaging said ribbon under pressure at a selective place on the mold and thereby defining a place of engagement of the ribbon on the mold, first removal means arranged for automatically removing the bottom protective film from the ribbon at a first point spaced upstream of said place of engagement, and second removal means arranged for automatically removing the top protective film from the ribbon at a second point downstream from said first point and substantially immediately upstream of and adjacent to said place of engagement, and simultaneously arranged for automatically guiding the composite strip accurately up to said second point for automatically applying to and engaging the ribbon accurately on the mold at said place of engagement.

2. Device of claim 1 wherein said second removal means for removing the top film comprises wedge-shaped separator means having a rounded edge located between a bottom surface and a top surface and means for laterally guiding the top film, said separator means being arranged for automatically causing the top film of said strip to arrive at the bottom surface, to turn in a generally reverse direction back around said rounded edge and to be removed along the top surface.

3. Device of claim 2 wherein said applicator means comprises a pad having a surface which engages the ribbon on the mold, said pad having a rear part forming said wedge-shaped separator means, said means for laterally guiding the top film being in the form of a calibrated slot having a width substantially equal to that of the strip, said slot having one wall thereof forming said top surface of said separator means, said slot having an entry formed in an immediate upstream part of said pad surface and forming therewith an acute angle to the direction in which the strip arrives at the pad.

4. Device of claim 3 wherein the pad is secured to a slide movable on a head in a direction substantially perpendicular to the pad surface and biased by a compression spring for urging the pad toward the mold.

5. Device of claim 1 wherein a fiber compacting element terminating in a resilient bead is disposed at the front of the applicator means as considered in a direction upstream of said second point, and carried by a mechanism giving it freedom of movement with two components, such components being an upward component and a forward component.

6. Device of claim 5 wherein the compacting element is biased by resilient means for urging the compacting element toward the mold.

7. Device of claim 5 wherein the mechanism carrying the compacting element is in the form of two side by side spaced apart rods disposed at a slight angle to each other, such that one of their common ends is closer to one another and the opposite common ends are more distant from one another, the rods being respectively articulated, at their common closer ends, to a member carrying the applicator means, and being respectively pivotally connected at their opposite common more distant ends to the compacting element.

8. Device for automatically shaping a ribbon of fibers onto a mold, from a composite strip formed of a ribbon of adhesive sized fiber elements of selective shape and dimensions and retained between a bottom protective film and a top protective film, the device comprising an applicator arranged for positioning at the mold for relative movement therebetween in an applying direction along the mold, and having an engagement portion arrnged at a local engagement point for automatically applying the ribbon to and pressing the ribbon against the mold during movement in said direction, a remote remover arranged for automatically removing the bottom protective film from the ribbon at a remote point spaced upstream of the engagement point in said direction, and an adjacent remover disposed in fixed relation to the engagement portion and arranged for automatically removing the top protective film from the ribbon at an adjacent point spaced downstream from the remote point in said direction and substantially immediately adjacent to and immediately upstream of the engagement point, and simultaneously arranged for automatically guiding the composite strip accurately from the remote point to the adjacent point for automatic accurate applying and pressing of the ribbon in turn onto the mold at the engagement point.

9. Device of claim 8 wherein the adjacent remover contains a guide at the adjacent point for automatically laterally guiding the top film negative to the engagement portion.

10. Device of claim 9 wherein the engagement portion and adjacent remover are mounted for common movement in fixed relation toward and away from the mold, and resilient biasing means are provided for normally resiliently biasing the engagement portion toward the mold.

11. Device of claim 8 wherein a resilient compacting bead is provided upstream of the engagement portion and arranged for automatically resiliently compacting the ribbon fiber elements on the mold.

* * * * *